United States Patent [19]

Staniland et al.

[11] 3,861,951

[45] Jan. 21, 1975

[54] COOKWARE COATED WITH AROMATIC POLYSULFONES

[75] Inventors: Philip Anthony Staniland, Welwyn; Graham Jarrett, Hitchin, both of England

[73] Assignee: Imperial Chemical Industries Limited, London, England

[22] Filed: Sept. 20, 1973

[21] Appl. No.: 399,342

Related U.S. Application Data

[63] Continuation-in-part of Ser. No. 207,958, Dec. 14, 1971, Pat. No. 3,787,363.

[30] Foreign Application Priority Data

Dec. 22, 1970 Great Britain.................... 60907/70

[52] U.S. Cl...... 117/161 R, 117/123 D, 117/132 B, 117/132 C, 260/49, 260/79.3 R
[51] Int. Cl. .. A47j 36/04, C08g 49/00, C08g 49/04
[58] Field of Search............ 260/49, 79.3 R, 79.5 R; 117/123 D, 132 C, 161 R, 161 UE

[56] References Cited
UNITED STATES PATENTS

| | | | |
|---|---|---|---|
| 3,446,654 | 5/1969 | Barth | 117/123 |
| 3,492,125 | 1/1970 | Ray | 117/161 R X |
| 3,518,235 | 6/1970 | Cohen | 260/79.3 |
| 3,579,475 | 5/1971 | Jones | 260/37 |
| 3,728,313 | 4/1973 | Hill | 260/79 |

*Primary Examiner*—Mayer Weinblatt
*Assistant Examiner*—Dennis L. Albrecht
*Attorney, Agent, or Firm*—Cushman, Darby & Cushman

[57] ABSTRACT

A mixture comprising 95 to 99.99 percent by weight of at least one mouldable or film-forming thermoplastic aromatic polysulphone containing repeat units -AR-SO$_2$-where Ar is a bivalent aromatic radical which may vary from unit to unit in the polymer chain, at least some of the Ar units having an ether link joining aromatic carbons in the polymer chain ortho or para to at least one -SO$_2$- group and 5 to 0.01 percent by weight of sulphur present as at least one member of the class consisting of elemental sulphur, aliphatic and aromatic dithiols, and polymeric oxidation products thereof comprising repeat units of the formula -R-S-S- where R is a bivalent aliphatic or aromatic radical, said mixture forming a polymeric material of increased molecular weight, compared to the molecular weight of said polysulphone, when heated between 300° and 450°C. The polymeric materials having increased molecular weight are useful for coating non-cooking surfaces of cookware.

2 Claims, No Drawings

COOKWARE COATED WITH AROMATIC POLYSULFONES

This is a continuation-in-part Application of U.S. Application Ser. No. 207,958 filed 14 Dec. 1971 now U.S. Pat. No. 3,787,363.

This invention relates to aromatic polymers and in particular it relates to mixtures of thermoplastic aromatic polysulphones and certain sulphur compounds and to aromatic polymeric materials of increased molecular weight obtained therefrom.

According to the present invention there is provided a mixture comprising 95 to 99.99 percent by weight of at least one thermoplastic aromatic polysulphone containing repeat units -Ar-SO$_2$- (where Ar is a bivalent aromatic residue which may vary from unit to unit in the polymer chain and at least some of the Ar units have an aromatic ether group in the polymer chain ortho or para to at least one -SO$_2$- group) and 5 to 0.01 percent by weight of sulphur present as elemental sulphur, sulphide or disulphide in at least one compound selected from the class consisting of elemental sulphur, aliphatic and aromatic dithiols, and aliphatic and aromatic polydisulphides. According to the invention in another aspect, polymeric materials of increased molecular weight are obtained by heating these mixtures at temperatures between 300° and 450°C.

Aromatic polysulphones containing aromatic ether groups in the polymer chain ortho or para to at least one -SO$_2$- group, and methods for making them, are described in British Pat. Specifications Nos. 1 016 245; 1 060 546; 1 078 234; 1 109 842; 1 122 192; 1 133 561; 1 153 035; 1 153 528, 1 177 183 and 1 234 301 and Netherlands Pat. Specification No. 70 11346, the disclosures of which are incorporated herein by reference.

The aromatic polysulphones described in the above-mentioned specifications comprise repeating units of the formula -Ar-SO$_2$- in which Ar is a bivalent aromatic radical and may vary from unit to unit in the polymer chain (so as to form copolymers of various kinds). The polysulphones having at least some units of the structure

in which Y is oxygen or the residue of an aromatic diol such as a 4,4'-bisphenol are generally thermoplastic. One example of such polysulphones which are commercially available has repeating units of the formula

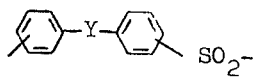

(Imperial Chemical Industries Limited) and another is said to have units of the formula

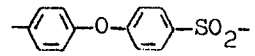

(Union Carbide Corporation) and another is said to have copolymerised units in various proportions of the formulae

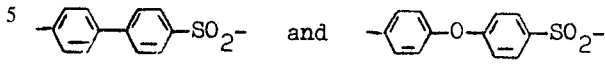

(Minnesota Mining and Manufacturing Company). Aliphatic hydrocarbon radicals are however preferably absent from the aromatic polysulphones either as linking groups or aromatic ring substituents. Another group of aromatic polysulphones has repeating units of the formula

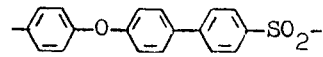

which may be copolymerised with units of other formulae given above.

When elemental sulphur is used as the sulphur compound in the mixture of the invention, sulphur dioxide is evolved on heating and can give rise to a foamed product unless the reaction is carried out under pressure. Of the dithiols, aromatic dithiols of the type HS-R-SH where R is a bivalent aromatic radical are preferred because aliphatic dithiols are generally volatile at the reaction temperature and may liberate hydrogen sulphide as a by-product. Preferred aromatic dithiols are biphenyl-4,4'-dithiol, bis-(mercapto phenyl) ether and bis-(4-mercapto phenyl) sulphone. Polydisulphides comprising repeat units having the formula -R-S-S- where R is a bivalent aliphatic and/or aromatic radical may also be used. The weight of sulphur is calculated as the amount of sulphur present as elemental sulphur, sulphide which includes mercaptan and thiol, or disulphide. A preferred range of sulphur content is 0.05 to 2 percent by weight.

The polymeric materials of increased molecular weight are prepared by heating a mixture of a thermoplastic aromatic polysulphone with a sulphur compound as hereinbefore defined at a temperature between 300° and 450°C preferably between 340° and 400°C. At temperatures below 300°C the reaction is very slow and at temperatures above 450°C, the aromatic polysulphone may begin to decompose.

When the amount of sulphur compound in the mixtures of the invention is more than 0.1 percent and the reaction time and temperature are sufficiently high, the polymeric materials obtained are cross-linked and essentially insoluble in solvents for thermoplastic aromatic polysulphones and are not thermoplastic although (at temperatures above the glass transition temperature of the thermoplastic aromatic polysulphone from which they are derived) they are similar in physical behaviour to rubbers.

If the amount of sulphur compound in the mixtures of the invention is less than 0.1 percent, or if the reaction time or temperature are lower than required for cross-linking, the polymeric materials obtained may still be thermoplastic, although of increased molecular weight, and soluble in solvents for the polysulphone precursors.

Compared with the thermoplastic aromatic polysulphone precursor, the materials of increased molecular weight have improved resistance to ageing under stress at elevated temperatures and to stress cracking and crazing in solvents. The "cut through" temperature as

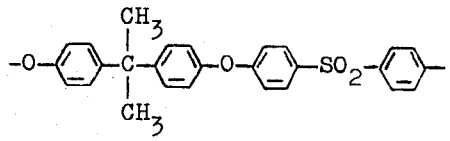

hereinafter defined of film of these materials is also higher than that of film composed of the thermoplastic aromatic polysulphone precursor.

In order to prepare the mixtures of the invention, the thermoplastic aromatic polysulphone and the sulphur compound may be mixed as dry powders or in the melt (for example in a mill, a sigma-blade mixer or an extruder) or in solution in a common solvent such as for example dimethyl formamide. The mixing should take place at a temperature below that at which chemical reaction occurs, or if carried out at a higher temperature, for a time such that the effects of the reaction are insignificant. The mixture may then be moulded or formed into any desired shape prior to heating to a temperature at which the polymeric product of the invention is formed.

If the sulphur ocmpound is elemental sulphur, it is preferable that the mixture of the invention is moulded under pressure if an unfoamed or bubble-free moulding is required and that the concentration of elemental sulphur is 1 percent by weight or less. A foamed product may be prepared if the mixture is heated essentially in the absence of imposed pressure. A preferred concentration range of elemental sulphur is then 1 to 5 percent by weight if the foam is to be produced using only elemental sulphur. A foamed product may also be prepared by blending the mixture of the invention with a conventional foaming or blowing agent, which preferably reacts between 300° and 450°C.

The mixtures of the invention may be used in the manufacture of objects containing the new polymeric materials in the form of components such as, for example heat-resistant foams, mouldings, films and coatings and heat-resistant insulation of electrical conductors.

According to a further aspect of the present invention coated cookware is provided having a non-cooking surface coated with aromatic polysulphone having molecular weight increased subsequent to coating. The coating on the cookware of the present invention preferably comprises pigmented aromatic polysulphone.

Decorative cookware often comprises a metal dish particularly cast iron coated with an enamel. Such cookware is generally expensive and can be prone to chipping of the enamel. Other decorative cookware comprises heat resistant glass or other vitreous material which is often pigmented, but such cookware is also generally expensive. The present embodiment provides cookware in which conventional cookware is decorated by a comparatively cheap, heat resistant coating. Increasing of molecular weight generally leads to improved resistance to washing-up or dish-washing procedures, and prevents softening and flow of the coating if it should become overheated.

The pigment which is preferably present in the coated cookware of the embodiment of the present invention is any pigment which is stable at the cooking temperature and the temperature at which the aromatic polysulphone is treated after coating, if so treated. Suitable pigments include for example titanium dioxide, carbon black cadmium pigments.

The mixture of the invention, if desired premixed with pigment can be applied by any one of a variety of methods. The mixture can be applied from solution, optionally containing dispersed pigment and the cookware coated by for example spraying or dipping followed by solvent evaporation. The solvent is preferably one giving a polymer solution having long pot-life: for example mixtures of cyclohexanone (15–20 parts by volume), methyl ethyl ketone (4–7 parts) and dimethyl sulphoxide (1–3 parts) containing 5 to 25 g of polymer in 100 cm³ of solution. The mixture may be coated by fluidized bed techniques or by spraying the mixture particles preferably in a gas against the surface to be coated while the surface is above the softening temperature of the polymer. Alternatively a paste of the mixture may be printed onto the surface or part of the surface by printing techniques such as screen printing. Also patterns can be produced by such printing techniques or by selectively etching or dissolving away selected portions of the coating. However if no pigment is present in the initial coating it is essential that pigment be added at some subsequent stage in order to obtain a pigmented patterned surface.

The cookware may be made of metal e.g., iron, aluminium, steel or of ceramic e.g., glass, pottery, porcelain. Examples of cookware are pans and dishes, pressure cookers, frying pans, baking tins, casserole dishes.

The invention is illustrated by the following examples, in which physical properties of the materials were measured as follows:

Reduced viscosity of the polysulphone was measured on a solution in dimethylformamide at 25°C containing 1 g of polymer in 100 cm³ of solution.

The "cut-through" temperature was determined using an apparatus similar to that of ASTM D1676, in which the apparatus had two electrodes comprising uninsulated tensioned copper wire mounted one above the other and separated by a piece of film under test. The upper electrode was subjected to a 1 kg downward/vertical load and the apparatus was placed in an oven with circulating air having a rate of temperature rise of 5°± 1°C per minute. The temperature at which the film softened sufficiently to allow continuity of circuit between the two electrodes was noted as the "cut-through" temperature.

The "yield strength," "break strength" and "elongation" of the film samples were determined at about 20°C on an "Instron" TM/M tensile tester having a clamp speed of 20 mm/min and using a film sample 20 mm long and 10 mm wide.

The thermoplastic aromatic polysulphone used in the examples had repeat units of the formula

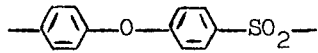

and was prepared in a manner similar to that described in Example 3 of British patent specification 1 153 035.

EXAMPLE 1

A sample (49.5 g) of thermoplastic aromatic polysulphone having a reduced viscosity of 0.40 was mixed as a powder with elemental sulphur powder (0.5 g) on a mill at ambient temperature. Samples of the mixture were compression-moulded into film having a thickness of 250μm by pressing the sample between chromium-plated surfaces at 350°C for 15 minutes. The surfaces were then cooled to 220°C and the film removed.

The film (A) was tough, slightly yellow and insoluble in dimethyl formamide. Its properties are compared in the following table with those of a film (B) similarly prepared from the aromatic polysulphone in the absence of sulphur.

| | FILM A | FILM B |
|---|---|---|
| Treatment with xylene | No crazing | crazed |
| Treatment with carbon tetrachloride | No crazing | crazed |
| "Cut-through" temperature | 300°C | 250°C |
| Tensile strength-before ageing | 8.3 kg/mm² | 8.4 kg/mm² |
| after ageing in air | | |
| for 14 days at 250°C | 9.2 kg/mm² | 8.0 kg/mm² |
| 28 days at 250°C | 9.4 kg/mm² | Distorted |
| 28 days at 270°C | 7.0 kg/mm² | Flowed |
| Elongation - before ageing | 13% | 15% |
| after ageing in air | | |
| for 14 days at 250°C | 13% | 12% |
| 28 days at 250°C | 10% | Distorted |
| 28 days at 270°C | 5% | Flowed |

The results show that film (A) has improved resistance to crazing, higher "cut-through" temperature and better retention of mechanical properties on ageing than film (B).

EXAMPLE 2

Samples (48 g) of thermoplastic aromatic polysulphone powder (reduced viscosity 0.40) were mixed with powder (2 g) of biphenyl-4,4'-dithiol, bis-(4-mercaptophenyl) sulphone or bis-4(4-mercaptophenyl) ether, and each mixture was compression-moulded as in Example 1 to give films having thickness 250μm. The films were not crazed by xylene or carbon tetrachloride. Plaques having thickness 3 mm were also obtained on compression-moulding the mixtures at 350°C for 15 minutes.

EXAMPLE 3

Polydisulphide having repeat units of the formula

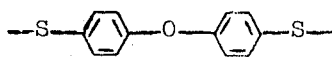

was prepared by the oxidation in air of bis-(4-mercaptophenyl) ether (2 g) at 25°C, and was blended in powder form with a sample (48 g) of thermoplastic aromatic polysulphone. The mixture was compression-moulded at 350°C for 15 minutes and cooled to 220°C as described in Example 1 to give a film having thickness 250μm. The film was not soluble in dimethyl formamide.

EXAMPLE 4

Polyethylene disulphide having repeat units of the formula

-SCH₂CH₂S- was prepared by the oxidation in air of ethane-1,2-dithiol (2 g) in methanol containing sodium hydroxide (0.1% w/w) at 25°C, and was blended in powder form with a sample (48 g) of thermoplastic aromatic polysulphone (reduced viscosity 0.40). The mixture was compression-moulded at 350°C for 15 minutes and cooled to 220°C as described in Example 1 to give a film having thickness 250μm. The film was not soluble in dimethyl formamide.

EXAMPLE 5

Lacquers were prepared by dissolving samples (9.6 g) of thermoplastic aromatic polysulphone (reduced viscosity 0.40) and 4,4'-biphenyl dithiol, bis-(4-mercaptophenyl) sulphone or bis-(4-mercaptophenyl) ether (0.4 g) in dimethyl formamide (30 cm³). Sections of copper wire (1 mm diameter) and aluminium foil (250μm thickness) were dip-coated with the lacquer and the solvent was removed by suspending the wire and foil in a stream of nitrogen at 150°C. The dip-coated wire and foil were then placed in an oven at 350°C for 15 minutes in an atmosphere of nitrogen after which time the wire and foil were found to have a coherent coating, which was insoluble in dimethyl formamide.

EXAMPLE 6

A sample of thermoplastic aromatic polysulphone (reduced viscosity 0.40) was blended in powder form with elemental sulphur (0.25 percent w/w). The blend was extruded at 350°C in an extruder having a dwell time of less than one minute (short compared with the time required for reaction to occur). The extrudate had reduced viscosity 0.40. The extrudate underwent reaction on heating at 350°C for a further 15 minutes to produce a film similar to that described in Example 1.

A similar extrudate was made from a blend of aromatic polysulphone and elemental sulphur (1% w/w), but the degree of cross-linking on heating at 350°C for a further 15 minutes was greater than that in the extrudate containing 0.25% w/w sulphur as evidenced by lower swelling in dimethylformamide.

EXAMPLE 7

A film (C) was prepared by the method described in Example 1 except that the aromatic polysulphone had a reduced viscosity of 0.41 and the concentration of elemental sulphur was 1 percent by weight. The physical properties of the film (C) are compared with those from a similar film (D) prepared from the aromatic polysulphone alone are shown in the following table.

| | FILM C | FILM D |
|---|---|---|
| Reaction to xylene | No crazing | Crazed |
| Reaction to carbon tetrachloride | No crazing | Crazed |
| Cut-through temperature | 283°C | 250°C |
| Tensile strength before ageing | | |
| measured at 20°C | 8.3 kg/mm² | 7.2 kg/mm² |
| measured at 180°C | 6.0 kg/mm² | 4.5 kg/mm² |
| measured at 200°C | 4.7 kg/mm² | 2.6 kg/mm² |
| After ageing 28 days at | | |
| 250°C measured at 20°C | 9.8 kg/mm² | 8.1 kg/mm² |
| Elongation before ageing | | |
| measured at 20°C | 13% | 20% |
| measured at 180°C | 12% | 7% |
| measured at 200°C | 9% | 6% |
| after ageing 28 days at | | |
| 250°C measured at 20°C | 12% | 14% |

EXAMPLE 8

Extrudate containing elemental sulphur (1 percent w/w) prepared according to the method of Example 6, was further heated in an oven in a nitrogen atmosphere at 350°C for 20 minutes. A foam was produced having density 0.25 g/cm³. The foam was insoluble in dimethyl formamide, self-extinguishing and did not melt or drip when heated in a gas-flame.

EXAMPLE 9

A powder mixture of thermoplastic aromatic polysulphone and elemental sulphur (1 percent w/w) prepared by the method of Example 1 was compression-moulded at 350°C for 2 minutes between steel plates (12 cm × 15 cm × 0.005 cm) held 2 mm apart by a third plate. The press was then partially opened so that the polymer melt expanded as a foam to form a layer 8 mm thick. The foam was held in the press for a further 13 minutes at 350°C before cooling to 250°C. The sandwich structure comprised the steel plates and the foam which was insoluble, non-thermoplastic and strongly bonded to the steel plates.

EXAMPLE 10

A sample of thermoplastic aromatic polysulphone having a reduced viscosity 0.40 was mixed as a powder with elemental sulphur powder (0.05 percent w/w) on a mill at ambient temperature. Samples of the mixture were compression-moulded into film at 350°C for 5, 10 and 20 minutes respectively. The film was soluble in dimethyl formamide and had reduced viscosities of 0.47; 0.48 and 0.49 respectively.

EXAMPLE 11

A sample of thermoplastic aromatic polysulphone having a reduced viscosity 0.40 was mixed as a powder with elemental sulphur powder (1 percent w/w) on a mill at ambient temperature. Samples of the mixture were compression-moulded into film at 320°C for 5, 10, 15, 20 and 30 minutes. The films formed on compression-moulding for 5, 10 and 15 minutes were soluble in dimethyl formamide and resulting polymers found to have reduced viscosities of 0.40, 0.43 and 0.54 respectively. The films formed on compression-moulding for 20 and 30 minutes were insoluble in dimethyl formamide.

EXAMPLE 12

Thermoplastic aromatic polysulphone having repeat units of the formula

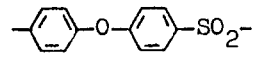

was prepared in a manner similar to that described in Example 3 of British patent specification 1,153,035. The polymer had a reduced viscosity of 0.40 at 25°C in dimethyl formamide (1 percent w/v). A sample (49.5 g) of the polymer and elemental sulphur (0.5 g) were dissolved in dimethyl formamide (200 cm$^3$) at 100°C. The solution was used to coat the exterior non-cooking surface of an aluminium pan depth 10 cm and diameter 20 cm. The coating was dried by heating at 150°C for 1 hour followed by heating at 350°C for 15 minutes. The coating was insoluble in dimethyl formamide. The coating had excellent performance and appearance even after repeated heating.

We claim:

1. Cookware having non-cooking surface coated with the product obtained by heating to a temperature between 300° and 450°C, a mixture comprising 95 to 99.99 percent by weight of at least one mouldable or film-forming thermoplastic aromatic polysulphone containing repeat units -Ar-SO$_2$- where Ar is a bivalent aromatic radical which may vary from unit to unit in the polymer chain, at least some of the Ar units having an ether link joining aromatic carbons in the polymer chain ortho or para to a least one -SO$_2$- group and 5 to 0.01 percent by weight of sulphur present as at least one member of the class consisting of elemental sulphur, aliphatic and aromatic dithiols, and polymeric oxidation products thereof comprising repeat units of the formula -R-S-S- where R is a bivalent aliphatic or aromatic radical, said mixture forming a polymeric material of increased molecular weight, compared to the molecular weight of said polysulphone, when heated between 300° and 450°C.

2. Cookware according to claim 1 in which the coating contains a pigment.

* * * * *